US007600003B1

(12) United States Patent
Okmianski et al.

(10) Patent No.: US 7,600,003 B1
(45) Date of Patent: Oct. 6, 2009

(54) METHOD AND APPARATUS FOR DYNAMICALLY CONFIGURING CUSTOMER PREMISES NETWORK EQUIPMENT

(75) Inventors: Anton Okmianski, Lincoln, MA (US); Greg Morris, Nashua, NH (US); Timothy Webb, Concord, MA (US); Mickael Graham, Arlington, MA (US); David K. Bainbridge, Acton, MA (US); Adam L. Taylor, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1196 days.

(21) Appl. No.: 10/128,163

(22) Filed: Apr. 22, 2002

(51) Int. Cl.
G06F 15/16 (2006.01)
G06F 15/177 (2006.01)
G06F 15/173 (2006.01)

(52) U.S. Cl. .................... 709/220; 709/224; 709/217
(58) Field of Classification Search .............. 709/220, 709/221, 223
See application file for complete search history.

(56) References Cited

U.S. PATENT DOCUMENTS

| | | | | |
|---|---|---|---|---|
| 5,838,921 A * | 11/1998 | Speeter | ................. | 709/227 |
| 6,049,826 A * | 4/2000 | Beser | .................... | 709/222 |
| 6,061,693 A * | 5/2000 | Carney et al. | ............... | 707/200 |
| 6,195,689 B1 * | 2/2001 | Bahlmann | ................ | 709/217 |
| 6,286,038 B1 * | 9/2001 | Reichmeyer et al. | ........ | 709/220 |
| 6,324,578 B1 * | 11/2001 | Cox et al. | ................... | 709/223 |
| 6,374,295 B2 * | 4/2002 | Farrow et al. | ............... | 709/223 |
| 6,487,594 B1 * | 11/2002 | Bahlmann | ................. | 709/225 |
| 6,594,695 B1 * | 7/2003 | Vasamsetti et al. | .......... | 709/220 |
| 6,598,057 B1 * | 7/2003 | Synnestvedt et al. | ........ | 709/220 |
| 6,611,863 B1 * | 8/2003 | Banginwar | ................. | 709/220 |
| 6,751,659 B1 * | 6/2004 | Fenger et al. | ............... | 709/223 |
| 6,766,364 B2 * | 7/2004 | Moyer et al. | ................. | 709/221 |
| 6,973,488 B1 * | 12/2005 | Yavatkar et al. | ............. | 709/223 |
| 7,073,055 B1 * | 7/2006 | Freed et al. | .................. | 713/155 |
| 7,111,054 B2 * | 9/2006 | Lo | ............................ | 709/220 |
| 7,343,401 B2 * | 3/2008 | Tachibana et al. | ........... | 709/220 |
| 7,376,718 B2 * | 5/2008 | Gould et al. | ................ | 709/220 |
| 7,395,322 B2 * | 7/2008 | Harvey et al. | ............... | 709/220 |
| 2003/0069946 A1 * | 4/2003 | Nair et al. | ................... | 709/220 |

OTHER PUBLICATIONS

K. Sollins, "The TFTP Protocol (Revision 2)," IETF RFC 1350, Jul. 1992.
R. Droms, "Dynamic Host Configuration Protocol," IETF RFC 2131, Mar. 1997.
S. Alexander et al., "DHCP Options and BOOTP Vendor Extensions," IETF RFC 2132, Mar. 1997.

* cited by examiner

*Primary Examiner*—Kevin Bates
(74) *Attorney, Agent, or Firm*—Hickman Palermo Truong & Becker LLP

(57) ABSTRACT

Techniques for configuring a customer premises equipment connected to a network of a network service provider include receiving configuration information at a distributed component on the network from a central unit on the network. The distributed component also receives from the customer premises equipment a request for values of configuration parameters that determine network properties for the customer premises equipment. The distributed component generates a set of values for the configuration parameters based on the request and the configuration information received from the central unit. The set of values are sent from the distributed component to the customer premises equipment. A system using these techniques is scalable with increasing numbers of customer premises equipments simultaneously requesting values for configuration parameters and is robust in face of equipment failure at a distributed component or at the central unit or both.

48 Claims, 7 Drawing Sheets

200 CONFIGURATION CONTEXT

202 STATIC VALUES FOR SOME CONFIGURATION PARAMETERS

204 INSTRUCTIONS FOR GENERATING VALUES FOR OTHER CONFIGURATION PARAMETERS

206 CONDITIONS FOR VALIDITY OF CONTEXT

FIG. 2B

METHOD AND APPARATUS FOR DYNAMICALLY CONFIGURING CUSTOMER PREMISES NETWORK EQUIPMENT

FIELD OF THE INVENTION

The present invention generally relates to configuring devices that connect to a network. The invention relates more specifically to a robust, scalable, distributed system for dynamically configuring customer premises equipment that connects to a network for broadband network services.

BACKGROUND OF THE INVENTION

In large-scale cable modem networks, data, voice and other services are delivered over an Internet Protocol (IP) network that uses coaxial cable or fiber optic cable or both for communication links. The cable modem and the computer connected to the modem reside on the customer premises rather than on the premises of the network service provider, and the modem and connected computer are called hereinafter customer premises equipment (CPE). In this context, CPEs become active and inactive regularly as users initiate and terminate use of network services.

For each CPE to operate on the network, the customer premises equipment undergoes configuration for network operations. For example, the IP addresses for the modem and computer are allocated, the particular customer who owns or rents the modem is identified, the services to which the particular customer has subscribed are identified and modem settings are specified to provide the subscribed services.

Configuring each CPE device is a tedious process to perform manually. It takes time to manually allocate IP address by selecting them from thousands of IP addresses that might be in use, to determine to which services of dozens of services one customer of tens of thousands of customers has subscribed and build a custom configuration file. A human loses concentration and is prone to make errors before successfully completing such tasks. A manual process would be expensive, non-scalable and not real-time.

Furthermore, it is impractical to configure CPE devices manually because they may request configuration every time they are rebooted. It is impractical for a network service provider to send a network administrator to the customer premises every time the cable modem is turned on; it is impractical to expect that the cable modem be on at all times; it is impractical to expect an ordinary user to be able to configure a device; and it is impractical to ensure that a customer who does configure the device manually has configured the device correctly and only for the services to which the customer has subscribed.

Consequently, a provisioning server is commonly provided for the network at the service provider's headend facility, where the cable links from a large number of customer premises terminate. The provisioning server responds to messages from the modem announcing the modem's connection to the cable network, performs various operations to determine parameter values that indicate modem settings and network properties, and sends the parameter values to the modem in one or more messages. Often, parameter values are included in a file that is identified in one or more messages to the modem, and, in response, the modem performs a file transfer to download that file and obtain the parameter values.

For example, in the Data-Over-Cable Service Interface Specification (DOCSIS), cable connections from customer premises terminate at the cable modem termination system (CMTS) located at the headend. The DOCSIS is available at the time of this writing on the Word Wide Web at domain scte.org in file SP-RF1-CO1-011119.pdf of directory /standards/pdf/webdocs/. Under DOCSIS, a cable modem (CM) uses the dynamic host configuration protocol (DHCP) to request configuration information, such as the IP addresses for the customer premises equipment. DHCP is an open standard protocol for dynamic host configuration described in request for comments (RFC) documents numbered 2131 and 2132, available at the time of this writing as rfc2131.html and rfc2132.html, respectively, on the World Wide Web (www) at domain ietf.org. The CMTS receives a DHCP request message and relays it to the provisioning server, which generates a DHCP response message. The DHCP response message includes the lease for an IP address to be used by the CPE, the location of the file with configuration parameters and other parameters. The cable modem uses the trivial file transfer protocol (TFTP) to download the configuration file from the provisioning server. TFTP is an open standard protocol for file transfer between different hosts, described in request for comments (RFC) document numbered 1350, available at the time of this writing as rfc1350.txt on the World Wide Web (www) at domain ietf.org.

However, this design poses some challenges. First, if the CMTS goes offline, all cable modems terminated by this CMTS have to go through configuration process equivalent to the one they do during reboot. This generates a considerable load on the provisioning server, which it must be able to handle efficiently. The provisioning system must be robust in the face of power outage at the cable headend.

Second, a similar or greater load on the provisioning server may be generated when a neighborhood is restored to power after a power failure. The provisioning server may have insufficient computing power on the headend device to handle all the configuration requests. Many CPE devices will have to wait too long to be configured and commence receiving network services. The more subscribers there are connected to a headend, the more severe the problem.

One approach is to define a static set of values for all configuration parameters for a particular CPE device so that computational resources are not excessively consumed when CPE devices come online. However, this approach is undesirable because it does not allow for a user to readily change the network services to which the user subscribes. Furthermore, a static approach is inconsistent with dynamic allocation of IP network addresses that is employed to conserve a limited number of IP addresses.

In addition, the static values approach is inconsistent with current techniques for ensuring the validity of configurations of certain network services. For example, DOCSIS provides for optionally including security data along with the configuration parameters for the customer premises equipment. The security data is sent with the values of the configuration parameters to the customer premises equipment. The customer premises equipment includes the security data with the request for network services sent to the CMTS. The CMTS uses the security data to verify the request. One example of such optional security data is the IP address assigned to the customer premises equipment. If this data is included it allows the CMTS to confirm the configuration parameters were intended for this device. Another example is the current time. If the time the provisioning server prepared the configuration parameters is included as security data, the CMTS can confirm the device is using a current set of configuration parameters. The IP address changes over time and is not static. The current time needs to be obtained each time the configuration parameters are supplied by the provisioning server. A set of static configuration parameters would not be able to include this non-static security data and support these important aspects of the DOCSIS security mechanism.

A variation on the static approach is to give static values for as many configuration parameters as possible for as many customers as possible, but to allow a limited number of parameters to have dynamically altered values. This approach has the advantage of being consistent with dynamically assigned IP network addresses and the security mechanisms of specific technologies.

Another approach is to provide several provisioning servers to share the load. For example, several DHCP servers are often made available to provide IP network addresses for devices that connect to a network. An advantage of this approach is that if one of the provisioning servers goes down, another provisioning server can provide the configuration data. Such an approach is more robust in the face of equipment failure. DHCP servers do not provide values for all the configuration parameters, such as the security mechanism parameters, used by DOCSIS.

The problem with multiple servers is that it is tedious for a network administrator to update the servers when configuration information changes. For example, if a user subscribes to additional services, such as greater download bandwidth for faster downloads, or voice over IP, the system administrator must log onto the multiple provisioning servers and make that same change repeatedly. It is likely that one of the entries may be made incorrectly or forgotten completely.

Based on the foregoing, there is a clear need for a dynamic configuration system that is scalable, in the sense that it can accommodate large numbers of customer premises equipments simultaneously requesting values for configuration parameters. There is also a need for a dynamic configuration system that is robust in response to equipment failure.

The past approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent from the following description, are achieved in the present invention, which comprises, in one aspect, a method for configuring a customer premises equipment connected to a network of a network service provider. The method includes receiving configuration context information at a distributed component on the network from a central unit on the network. The distributed component also receives from the customer premises equipment a request for values of configuration parameters that determine network properties for the customer premises equipment. The distributed component generates a set of values for the configuration parameters based on the request and the configuration context information received from the central unit. The set of values are sent from the distributed component to the customer premises equipment.

According to one feature of this aspect, the configuration context information includes data indicating conditions for validity of the configuration context information at the distributed component.

According to another feature, the distributed component determines whether the conditions for validity are satisfied. If it is determined that the conditions are not satisfied, then a request is sent from the distributed component to the central unit to obtain a configuration information update from the central unit. The update may be an incremental update.

The configuration information may include instructions that cause a processor at the distributed component to perform the step of generating a value of a parameter of the configuration parameters, and the step of generating the set of values may include executing such instructions.

According to another feature, the configuration information includes data indicating one or more static values for one or more configuration parameters.

According to another feature, the configuration context information received from the central unit may contain static values, instructions and validity rules which can be different for each device as well as common for a group of devices.

According to another feature, a method includes generating and storing, at the central unit on the network, configuration information for groups of customer premises equipments. Each group is associated with a set of one or more distributed components on the network. Any distributed component provides, to any customer premises equipment in the group, values for configuration parameters that determine network properties for the customer premises equipment. The central unit determines whether to send the configuration information stored at the central unit for a particular group to the distributed components for that particular group. If it is determined to send the configuration information for the particular group, configuration information for the particular group is sent to the set of one or more distributed components associated with the particular group.

According to another feature, the configuration of all devices may be controlled through the central unit by means of sending a new configuration context or incremental changes to the configuration context to distributed components when configuration parameters have changed.

According to another feature, the step of determining whether to send an update of configuration information for the particular group involves receiving data indicating a change from a distributed component associated with the particular group in response to determining at the distributed component that the conditions for validity are not satisfied.

According to another feature, the distributed component may send a request to the central unit for configuration information update if its configuration information does not contain details for the device requesting the configuration.

According to another feature, the distributed component's request for the configuration information update to the central unit may include parameters received by the distributed component from the device in its configuration request. These parameters may in turn be used by the central unit to build the configuration information for the distributed component.

According to another feature, the central unit may distribute a configuration information containing data, instructions and validation rules to allow the distributed component to configure devices that are not explicitly identified in the configuration context.

According to another feature, the distributed units are always kept up to date with the latest configuration information in spite of network connection interruptions or system failures at the distributed component or the central unit.

In other aspects, the invention encompasses a computer apparatus, a system, and a computer readable medium configured to carry out the foregoing steps.

A system using these techniques is scalable with increasing numbers of customer premises equipments simultaneously requesting values for configuration parameters and is robust in face of equipment failure at a distributed component or at the central unit or both. The number of distributed components is increased as the number of customers increase to provide the extra computational power required to handle nearly simultaneous configuration requests, so the system is scalable. If at least two distributed components are available for each group of customer premises equipments, then the system is robust against equipment failure at either distributed device. Because the configuration information from the central unit is moved to the distributed components, configuration can continue even in the face of equipment failure at the central unit. Updating configuration information is easy, because an administrator only need update the central unit. The configuration information is automatically propagated to the distributed units from the central unit as appropriate.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B is a block diagram illustrating a configuration context included in one or more messages of FIG. 2A, according to an embodiment;

DETAILED DESCRIPTION OF THE PREFERRED EMBODIMENT

A method and apparatus are described for configuring a customer premises equipment device that is connected to a network of a network service provider. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described according to the following outline.
   Operational Context
   Structural Overview
   Configuration Context Information
   Functional Overview
   Method On Distributed Component
   Method On Central Unit
   Hardware Overview
   Extensions And Alternatives
   Operational Context To illustrate robust, scalable, dynamic configuration of customer premises equipment, the embodiments described herein are in the operational context of configuring cable modems for operation on a broadband cable network according to DOCSIS. In this context, DHCP is used to communicate configuration parameter values to the cable modem, and TFTP is used to download a configuration file with other configuration parameter values to the cable modem. However, other embodiments may be used in any context in which devices are configured for network operations, including using other protocols than DHCP and TFTP to communicate the values of the configuration parameters. For example, the techniques of the present invention may be applied to configuration information communicated using Simple Network Management Protocol (SNMP).

Structural Overview

Figure 1:
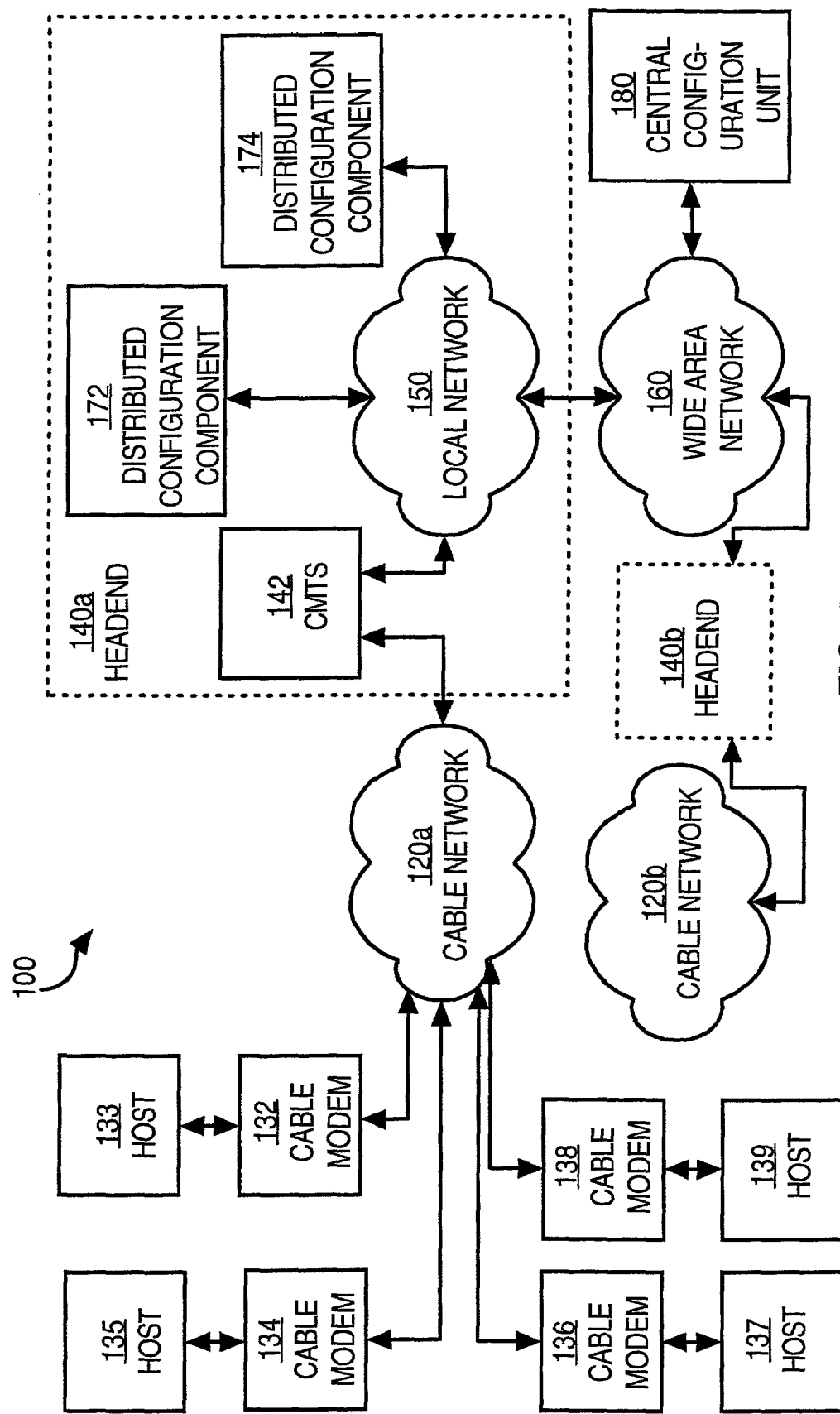
FIG. 1 is a block diagram that illustrates a network with distributed customer premises equipment configuration, according to an embodiment.

FIG. 1 is a block diagram that illustrates a network 100 with distributed configuration of customer premises equipments, according to an embodiment. As shown in FIG. 1, a cable network 120a links multiple cable modems 132, 134, 136, 138 at corresponding multiple customer premises to a cable modem termination system (CMTS) 142 in a facility of a cable network service provider called a headend 140a. A headend is a service provider's facility where cable links from a large number of customer premises terminate. For purposes of illustrating a simple example, FIG. 1 depicts only four cable modems. In practice, a single CMTS may be connected to many thousands of cable modems.

Connected to each cable modem 132, 134, 136, 138 is a corresponding host computer 133, 135, 137, 139, respectively, on the customer premises. Though depicted with one host connected to each cable modem, in other embodiments multiple computers may be connected to each cable modem through a customer premises local network. Although only cable modems and computers are depicted for the purposes of this example, other devices can be fully or partially configured using the methods suggested in this patent.

Various components of the system at the headend 140a are connected through a local network 150. For example DHCP and TFTP servers, not shown, of the conventional DOCSIS system are connected to the CMTS 142 through the local network 150. As an example, in FIG. 1, only one CMTS 142 is shown in the headend 140a; however, a headend may have several CMTSs, each terminating cable links for a few thousand cable modems; thus one headend may typically serve up to a few hundred thousand CPEs.

Multiple distributed configuration components (DCCs) 172, 174 are connected to the local network 150 to provide values of configuration parameters for customer premises equipments, i.e., to "provision" the customer premises equipments. Each DCC is a host computer that contains configuration information applicable to the CPEs connected to CMTSs on the local network 150. The DCCs also serve as the platform for one or more processes that maintain the cached information and that dynamically generate the values of configuration parameters to provision the CPEs connected to the CMTSs on local network 150. Although two DCCs 172, 174 are shown, in other embodiments additional DCCs may be included in the headend 140a. The number of DCCs is readily determined through routine monitoring and pre-deployment performance analysis in order to adequately provision CPEs during periods of peak demand. Multiple DCCs can be used to provide redundancy in a head-end.

The local network 150 of the headend 140a is connected to a wide area network 160, through which IP data packets are sent to any device connected to the wide area network 160. In some embodiments, the wide area network 160 is the Internet.

Other headend systems, such as headend 140b, may be connected to the wide area network 160. Headend 140b includes a CMTS, not shown, for another cable network 120b, which provides cable links to other cable modems and hosts on other customer premises. For purposes of illustration, the same network service provider is assumed to operate several headend systems, including headends 140a, 140b.

A central configuration unit (CCU) 180 is connected to the wide area network 160. CCU 180 is a host computer that serves as a central repository for configuration information for a large number of customer premises equipments for the network service provider. The CCU 180 also serves as a platform for a process that maintains and updates the central repository and that propagates configuration information from the central repository to the distributed configuration components.

In general, two or more DCCs are associated with one provisioning group of customer premises equipments. For example, in one embodiment, all the customer premises equipments connected to CMTS 142 are considered one provisioning group of customer premises equipments associated with DCCs 172, 174. In another embodiment, all the customer premises equipments connected to all the CMTSs in headend 140a are considered one provisioning group associated with DCCs 172, 174. In yet another embodiment, all the customer premises equipments connected to all the CMTSs in headends 140a, 140b are considered one provisioning group associated with DCCs 172, 174.

Although the DCCs 172, 174 are depicted in the headend 140a, in other embodiments one or both of them may be connected to the wide area network 160 outside the headend 140a. In general, the DCCs associated with a provisioning group of customer premises equipments should be closer to the provisioning group than the central configuration unit 180 is to the provisioning group. The DCCs are closer than the CCU to the provisioning group in the sense that fewer network hops between network devices such as switches and routers are taken by data packets during communications between the DCCs and customer premises equipments of the associated provisioning group, or they have links with larger bandwidth, links with smaller delay, links with better reliability, or a combination of the foregoing.

Configuration Context Information

Figure 2A:
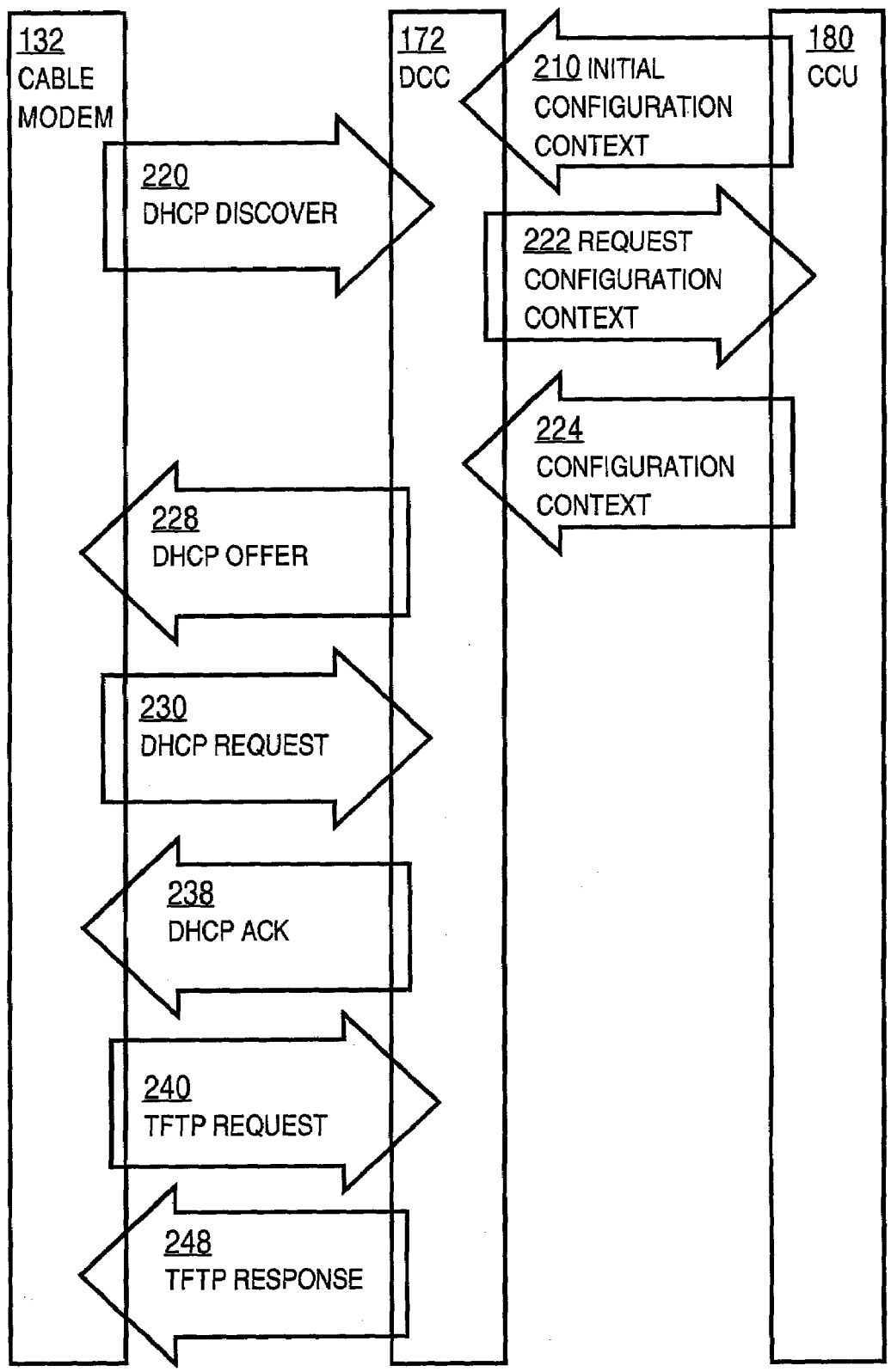
FIG. 2A is a block diagram illustrating a sequence of messages exchanged between customer premises equipment, distributed configuration component and central configuration unit, according to an embodiment.

FIG. 2A is a block diagram illustrating a sequence of messages exchanged between a customer premises equipment (CPE) device, a distributed configuration component (DCC) and central configuration unit (CCU), according to one embodiment. For purposes of showing an example, FIG. 2A shows messaging among cable modem 132 of FIG. 1, DCC 172 of FIG. 1, and CCU 180 of FIG. 1. Messages from cable modem 132 are passed to the CMTS and repackaged in IP data packets by the CMTS and placed on the local network 150 for delivery to DCC 172. The messages between DCC 172 and CCU are passed as payload in IP data packets over local network 150 and wide area network 160.

Message 210 is sent from the CCU 180 to DCC 172 and all the other DCCs associated with the same provisioning group. For purposes of illustration, assume that DCC 172 is associated with a certain provisioning group, hereinafter called the "Alice Provisioning Group." The Alice Provisioning Group includes all customer premises equipments that are connected to all the CMTSs of headend 140a. Further, assume that DCC 174 is associated with the Alice Provisioning Group, but that no other DCCs are associated with the Alice Provisioning Group. Thus, message 210 is passed to DCC 172 and DCC 174.

Message 210 includes the configuration context information used by the DCCs to configure the customer premises equipments of the Alice Provisioning Group. Because the configuration context information is only for the Alice Provisioning Group, no information for other provisioning groups is needed in the configuration context, such as for the customer premises equipments connected to headend 140b. Therefore, message 210 is smaller than if configuration context for all provisioning groups were included.

FIG. 2B is a block diagram illustrating configuration context information 200 (also called "configuration context") in one or more messages of FIG. 2A. Configuration context 200 includes a static portion 202, an instructions portion 204, and a validity conditions portion 206.

The static portion 202 holds static values for some configuration parameters that do not depend on network or device properties at the time the values are sent to the customer premises equipments. For example, the maximum bandwidth for a modem is a static value included in the static portion 202 of the configuration context. Static values of configuration parameters for particular devices may be expressed in any useful manner. In one embodiment, static values could be specified for each device identified by Media Access Control (MAC) address that is unique for a particular modem. In another embodiment, a set of the common static values can be specified for a group of devices identified by MAC addresses. In the latter approach, common static values can be specified only once, while other static values are specified individually for each device.

The instruction portion 204 holds instructions that cause a processor on the DCC to perform certain steps in order to dynamically determine values for one or more of the configuration parameters. The values determined based on these instructions may depend on network or device properties at the time the values are requested by the customer premises equipments. For example, the service that a customer subscribed to may call for a certain bandwidth. This may translate, among other things, into allocating an IP address for the customer's device from a certain address range that is given a priority on the network thus ensuring a different level of service. Portion 204 of the configuration context may call for IP address allocation from a certain address range for a certain device. When a request for a configuration is received from such a device, the IP address is dynamically allocated from a specific address range and is given out to the device in a DHCP response. The IP address may also be optionally provided in the configuration file or used for security features.

As with static values, instructions contained in the configuration context can be specified for in a manner such that each device has different instructions or common instructions can be identified for a group of devices.

The validity conditions portion 206 holds rules for validating the configuration context information stored locally at the DCC. The rules can be represented as instructions that are executed by a processor on the DCC. When the configuration context stored at the DCC is valid, the DCC processes requests for values of the configuration parameters without requesting information from the CCU. If the configuration context stored at the DCC is determined to be invalid, the DCC requests an update of configuration context from the CCU. In some embodiments, the DCC passes along to the CCU, in the request, data indicating why the locally stored context is invalid and additional information received in the configuration request from device.

For example, the validity conditions include instructions for determining that the local configuration context is invalid if the CMTS has changed since the device was last provisioned. As another example, the validity conditions include instructions that determine the local configuration context for a particular device is invalid if a particular customer premises host computer is connected to a different cable modem than it was connected to when it was previously provisioned.

In some embodiments, the capabilities of the cable modem are listed in one of the optional fields of the DHCP message. In such embodiments, another example of a validation condition is a set of instructions that determine whether the list of modem capabilities has changed. For example, if the firmware of the modem is changed to allow voice over IP, the list in the optional field changes. If such a change is detected, the configuration context for this device stored locally is invalid. The new capabilities are included in the request to the CCU to determine an updated configuration context.

As with static and instruction portions of the configuration context, the validation rules can be specified on a per device basis or a group of common validation rules can be associated with a set of devices.

The configuration context allows a CCU to control the DCCs without a heavy overhead of network traffic to keep the DCCs up to date. The configuration context not only passes all information needed to provision customer premises equipments at DCCs, but also enables the DCCs to automatically notify the CCU when the CCU should determine a change in the provisioning. Additionally, when the DCC requests an update to the configuration context from the CCU it can specify the device MAC address for which it needs additional configuration information. In this embodiment, only the configuration context information necessary to provision this device is sent by the CCU to the DCC.

Functional Overview

Referring again to FIG. 2A, all the DCCs of the provisioning group receive an initial configuration context in message 210. The DCCs store the configuration context in their cache. For example, DCC 172 and DCC 174 receive the configuration context from message 210 and store the configuration context in their cache.

A DHCP DISCOVER message 220 is sent from the cable modem 132 to the CMTS 142, which forwards the message to one or more of the DCCs associated with the Alice Provisioning Group. In one embodiment, the CMTS determines the DCCs to forward the DHCP message to based on the network where the DHCP message originated. The DHCP messages 220, 228, 230, 238 in FIG. 2A include optional fields used by the cable modem according to DOCSIS. For example, the DHCP messages include an optional field that lists the capabilities of the cable modem.

Upon receipt of the DHCP DISCOVER message, DCC 172 determines whether the locally stored configuration context is valid based on the validity conditions in the locally stored configuration context. For purposes of illustration, assume that the DCC cache does not have configuration information for the MAC address of the cable modem 132. The DCC sends request 222 for the missing configuration information to the CCU 180. In this example, the MAC address of the cable modem 132 and other data from the DHCP DISCOVER message, such as the list of modem capabilities, are included in request 222.

Upon receipt of the request 222, the CCU determines updated configuration information for the device that was requested. For example, if a service provider supports self-provisioning of new modems, the CCU can provide default settings for a modem so that the modem can later register with the CCU and subscribe to a particular set of network services. After the modem later registers for a particular set of services, the CCU will update the DDCs' configuration context to reflect those services. Alternatively, a service provider can choose a pre-provisioning mode of operation in which customers are required to first contact the service provider before connecting their cable modem. In this case the service provider would register the cable modem and associate it with network services. The CCU would then update the DCCs' configuration context with this cable modem's configuration information once this cable modem has booted on the network.

The updated configuration context is then sent in message 224 to the DCCs 172, 174 of the Alice Provisioning Group. The DCCs store the updated configuration context in their cache.

The DCC 172 uses the static portion and instructions portion of the configuration context information to generate values for the configuration parameters sent in DHCP messages, and sends the DHCP OFFER 228 to the cable modem 132. In some embodiments, the DCC 172 does not automatically generate and send the DHCP OFFER after receiving the updated configuration context in message 224; but instead, waits for another DHCP DISCOVER message from the cable modem 132. Another DHCP DISCOVER message is automatically sent by the cable modem 132 if no OFFER is received by the cable modem 132 within a given timeout period. A DHCP DISCOVER message received after the updated configuration context message 224 is received is likely to result in determining that the locally stored configuration context is valid. When the locally stored configuration information is determined to be valid, the DCC 172 generates and sends the DHCP OFFER 228 without sending to the CCU a request 222 for updated configuration context.

According to the DHCP protocol, in response to the OFFER 228, the cable modem 132 issues a DHCP REQUEST 230 accepting an OFFER. In response to the REQUEST 230, the DCC again determines whether the configuration information is valid and, if so, generates and sends the values of the configuration parameters that are included in the DHCP ACK message 238. Included in the configuration parameters is the name of a particular configuration file and the IP address where the configuration file resides (DCC 172).

In embodiments with multiple DCCs, the DCC that received the DHCP messages from the cable modem may select another DCC in its provisioning group to process the configuration file transfer. This is done by inserting the IP address of the DCC to process the configuration file transfer in the DHCP OFFER and DHCP ACK messages. For example, DCC 172 may select DCC 174 if DCC 174 is less utilized to process the configuration file request from cable modem 132. For purposes of illustration, assume that DCC 172 performs the entire configuration processing for cable modem 132.

According to the DOCSIS, in response to the DHCP ACK 238, the cable modem 132 issues a TFTP request 240 for the particular configuration file. In response to the request 240, the DCC again determines whether the configuration information is valid and, if so, generates and sends the values of the configuration parameters that are included in the particular configuration file. Included in the values of the configuration file is the encrypted hash used to verify at the CMTS any requests for services by cable modem 132.

Method on Distributed Component

Figure 3A:
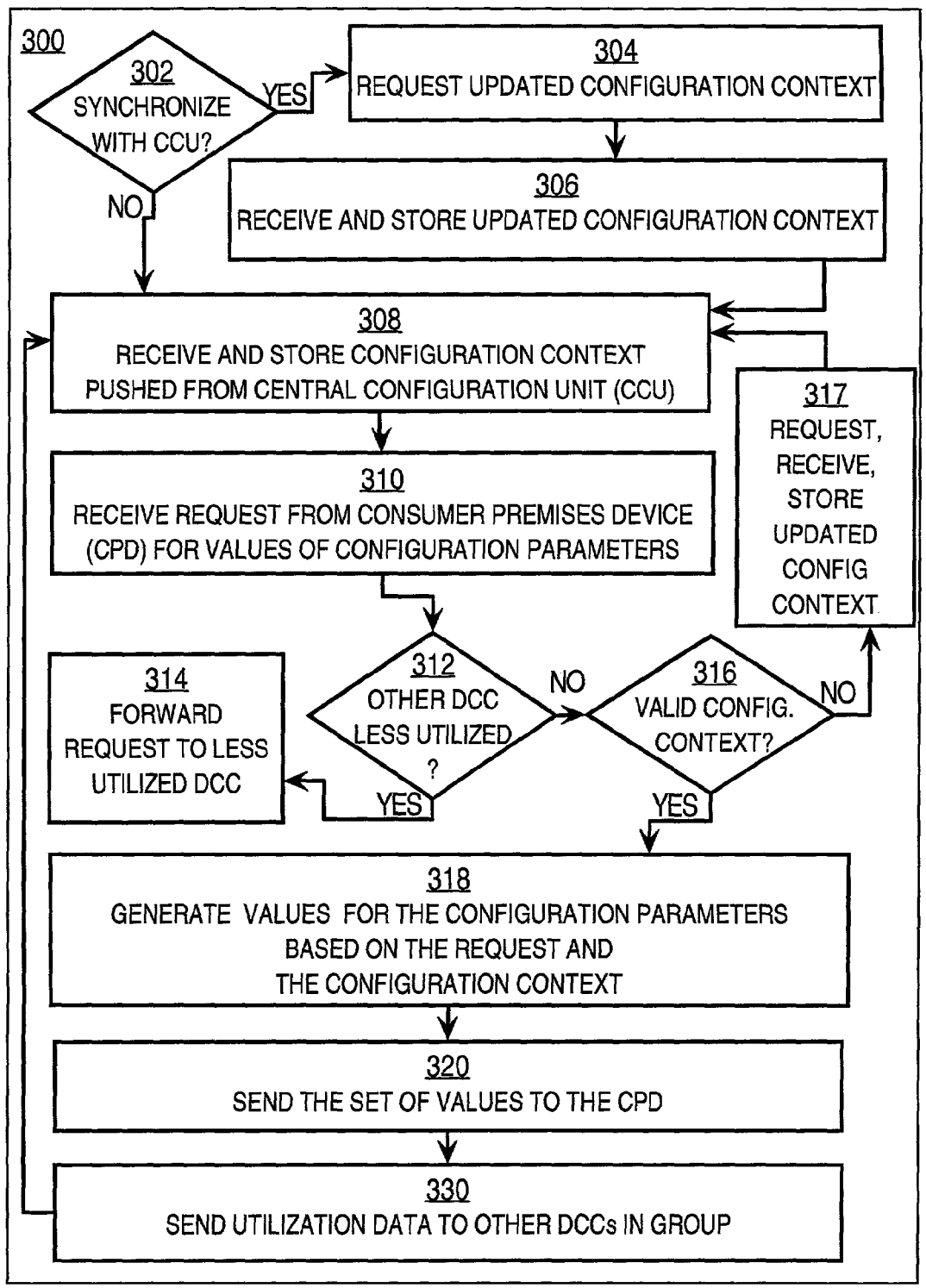
FIG. 3A is a flowchart that illustrates a high level overview of one embodiment of a method performed by a distributed configuration component.

FIG. 3A is a flowchart that illustrates a high level overview of embodiment 300 of a method performed by a distributed configuration component. Although steps are shown in FIG. 3A and subsequent flowcharts in a particular order, in other embodiments the steps may be performed in different orders or overlapping in time.

For purposes of illustration, examples of the method 300 are described using the DCCs 172, 174 shown in FIG. 1. It is assumed for purposes of illustration that DCC 172 processes DHCP messages exchanged with cable modem 132 and communicates with DCC 174 and the CCU 180. DCC 172 and DCC 174 service the Alice provisioning group. Each DCC 172, 174 is configured with the name of its provisioning group, and the IP address of CCU 180.

In step 302, the DCC determines whether to synchronize the configuration context stored locally with the configuration information stored at the CCU. This step is performed to recover from connectivity problems and outages at the DCC and CCU. For example, if DCC 174 lost power for a period of time, then it may have been offline when the configuration context was sent in message 210 of FIG. 2A. For purposes of illustration, it is assumed that the configuration context for each provisioning group has a version number for each MAC address. The version number is maintained by the CCU and stored by the DCCs. When a DCC commences operation, such as after a power outage, the DCC requests from the CCU the version numbers for the MAC addresses in the provisioning group. If the version number of any MAC address is after the version number stored locally, the local configuration context is out of date; and it is determined that the configuration context should be synchronized.

For example, provisioning engine 173b powers up, requests version numbers from the CCU 180 for the Alice Provisioning Group, and determines that the version numbers for two MAC addresses are too old and should be synchronized.

In the embodiment for the example, if it is determined in step 302 to synchronize the configuration context, control passes to step 304 to request the updated configuration information. The request includes the MAC addresses that are out of date and the DCC that is making the request. In some embodiments, step 304 includes sending a message to the other DCCs that this DCC is synchronizing with the CCU. In step 306, the updated configuration context information is received from the CCU and stored. In some embodiments, during step 306, messages are sent to the other DCCs that this DCC has completed synchronization. In other embodiments, synchronization between DCCs and the CCU is accomplished using guaranteed messaging of updates from the CCU to the DCCs. The DCC will coordinate with the messaging system to receive all messages missed while the DCC was offline.

For example, DCC 172 sends a request to CCU 180 for configuration information for the CPEs having the two MAC addresses with the out-of-sync version numbers. The DCC 172 notifies the other DCCs in the Alice provisioning group, in the example DCC 174, that the DCC is synchronizing. When the updated configuration information is received for the two MAC addresses, the DCC 172 stores the new configuration information into its configuration context and notifies DCC 174 that it has completed synchronization. The inter-DCC notification mechanism allows the relative state and load of the other DCCs to enable load balancing between the DCCs.

Through the synchronization steps 302, 304, 306, the DCCs maintain the currency of the locally stored configuration context. By leveraging incremental updates to the DCCs' configuration contexts, the load on the CCU is decreased, as is the load on the wide area network.

Whether synchronization is performed or not, control then passes to step 308 to receive any configuration information updates pushed from the CCU. The CCU pushes configuration information to all the DCCs in a provisioning group whenever the CPE's device configuration is changed at the CCU, such as by entries from a network administrator, self-registration by a customer, or a change induced as a result of a DCC encountering locally stored configuration information that fails validity rules.

For example, DCC 172, 174 receive configuration context message 210 of FIG. 2A from CCU 180. In some embodiments, only the incremental changes since the previous configuration context message 210 are sent to the DCCs instead of requiring the entire configuration context for the group to be sent.

In step 310, the DCC receives a request from a CPE for a set of configuration parameters. For example, DCC 172 receives from CMTS 142 a DHCP DISCOVER message 220 from cable modem 132 for DOCSIS configuration parameters. Also, for example, DCC 172 receives from cable modem 132 a DHCP REQUEST message 230 from cable modem 132 for DOCSIS configuration parameters.

In step 312, it is determined whether the request should be forwarded to another DCC that is less utilized than the DCC that received the request. This is done to accomplish load balancing among the DCCs. If possible, a DCC is selected that is not currently synchronizing its configuration context with the CCU. For example, based on utilization data for the DCCs 172, 174 distributed in the provisioning group as a result of step 330, described below, and synchronization data for DCCs 172, 174 received as a result of step 304, described above, DCC 172 determines that it is the least utilized since DCC 174 has a higher load.

If another DCC is less utilized, control passes to step 314 to send the request for configuration context to the other DCC. If not, control passes to step 316. In other embodiments, message 314 is not necessary since all DCCs may receive the request and can determine at that time which DCC will process the request. In this case, the flow for this DCC (the less utilized DCC) would be to not process the request and continue on to step 308.

In step 316, the DCC determines whether the locally stored configuration context is valid by testing the validity conditions in the DCC's configuration context. DCC 172 tests the conditions for validity in the configuration context for the cable modem and determines validity. For example, if the list of capabilities of the modem has changed, or the CMTS has changed, or the CPE host and modem pair is different, or if the provisioning engine returned a configuration miss message, then the DCC determines that the locally stored configuration context is not valid. In some embodiments, configuration context that is out of synchronization with the CCU, e.g., by having an earlier version number, but that is otherwise valid according to the conditions for validity, is considered valid in step 316; such embodiments allow a device to connect to the network using the last acceptable configuration context rather than being denied access to the network.

If it is determined in step 316 that the locally stored configuration context is not valid, control passes to step 317 to request, receive and store updated configuration context from the CCU. In some embodiments, the request includes data indicating the reason for invalidity, such as the list of modem capabilities, the new CMTS, or the new CPE host and modem pair.

For example, in step 317 the DCC sends the request 222 of FIG. 2A for updated configuration information. In response, every DCC in the Alice Provisioning Group (DCC 172, 174) receives updated configuration information from CCU in message 224 of FIG. 2A. In some embodiments, message 224 includes only configuration information for the cable modem 132 whose locally stored configuration information was found invalid in step 316.

After step 317, control returns to steps 308 and 310 to await the next message from the CCU or CPE. For example, after DCC 172 stores the updated configuration context, DCC 172 awaits the new DHCP DISCOVER message from the cable modem 132 after the timeout period.

If it is determined in step 316 that the locally stored configuration context is valid, control passes to step 318. In step 318, the DCC generates values for the configuration parameters that are sent to the CPE in the response message based on the request and the configuration context for the CPE. For example, DCC 172 uses the static portion of the configuration information extracted from the DCC's configuration context for the static configuration parameters. For example, the DCC 172 uses the configuration file associated with the cable modem 132 in the static portion 202 of the locally stored configuration context to set the value of the configuration file parameter for cable modem 132. DCC 172 also causes the instructions in the instructions portion 204 of the locally stored configuration context to be executed to dynamically generate other configuration parameters. For example, the DCC 172 interprets the instructions to set a particular DHCP field to the value of the IP address of the least utilized DCC to receive the TFTP request, so that the cable modem requests the configuration file from that DCC. In another example, DCC 172 interprets the instructions to insert into the configuration file the IP address assigned to the cable modem 132 during the DHCP negotiations.

In step 320 the set of values generated are sent to the CPE device from the DCC. For example, the DHCP OFFER message 228 or DHCP ACK message 238, with the configuration file field set to the IP address of DCC 172, is sent to the cable modem 132 and a configuration file for cable modem 132 is sent to the cable modem 132. More details on step 320 are given below.

In step 330 utilization data is sent to other DCCs in the provisioning group. This information is used by the other DCCs to determine which DCC should handle a request from a CPE. For example, DCC 174 sends messages to DCC 172 that describes the utilization of the DCC 174. This information is used by DCC 172 to determine which DCC should process the request from the device. After step 330, control returns to steps 308 and 310 to await the next message from the CCU or CPE.

Figure 3B:
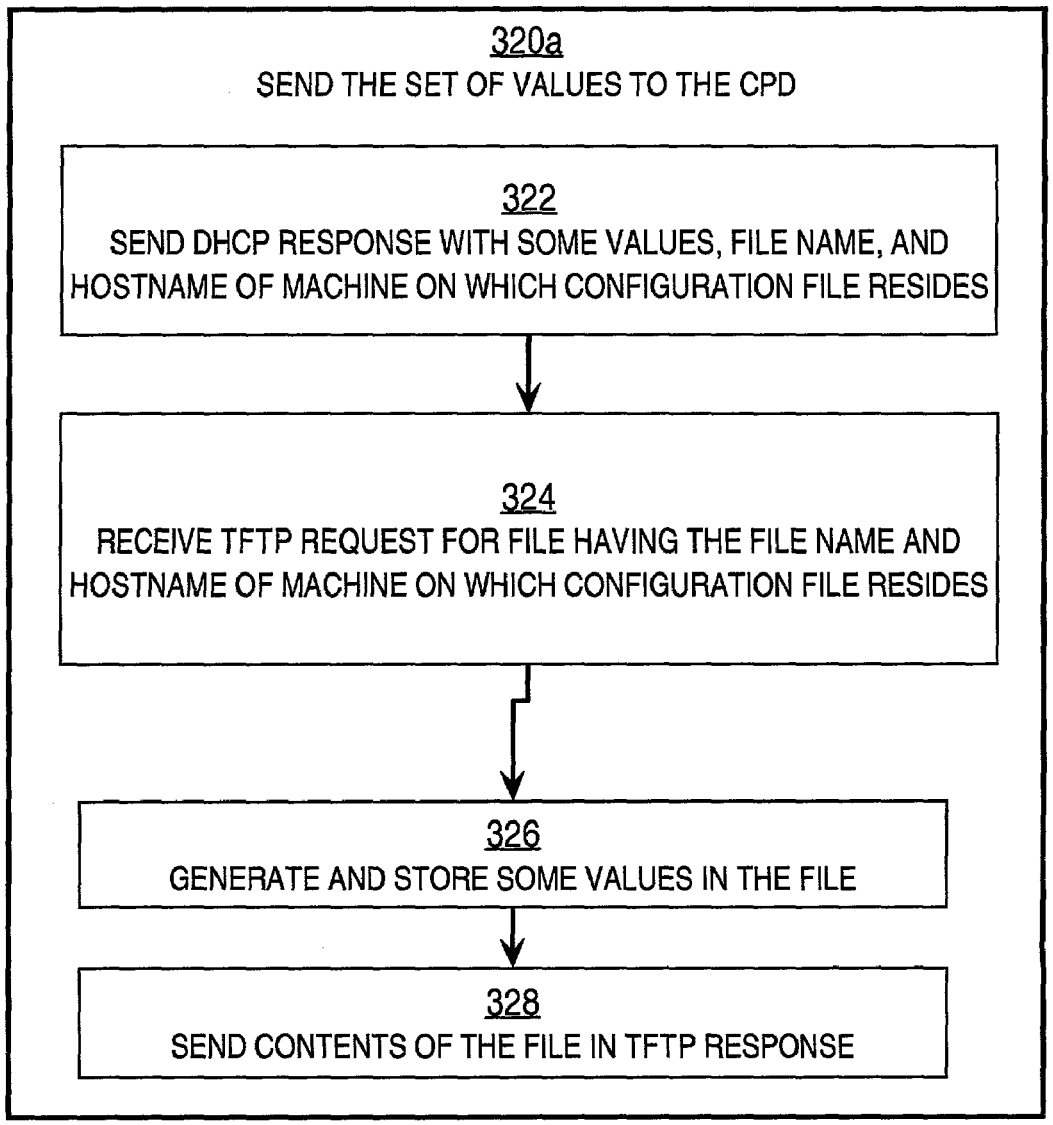
FIG. 3B is a flowchart that illustrates detailed steps of an embodiment of a step of FIG. 3A.

FIG. 3B is a flowchart that illustrates detailed steps of an embodiment 320a of step 320 of FIG. 3A for sending values of the configuration parameters to the CPE.

In step 322, a DHCP response packet is sent to the CPE with the applicable configuration parameters. For example, the DHCP OFFER message 228 and DHCP ACK message 238, with the configuration file host set to the IP address of the DCC 172 are sent to the cable modem 132.

In step 324, the DCC receives a TFTP request for the configuration file from the cable modem. For example, based on the IP address of the DCC 172 sent in the DHCP ACK during step 322, the cable modem 132 sends a TFTP request for the configuration file to the DCC 172.

In step 326, in response to the TFTP request received in step 324, in one embodiment, the DCC generates values for configuration parameters for the configuration file and stores those values in the configuration file. In other embodiments, the DCC pre-generates all values for configuration parameters anticipating the request from the device. For example, DCC 172 generates a secure hash of configuration data using the shared secret. The secure hash is then stored in the configuration file.

In step 328, the configuration file is sent to the CPE in the TFTP response. For example, the configuration file with the secure hash is sent to the cable modem 132. This completes the provisioning of the CPE, such as cable modem 132.

Method on Central Unit

Figure 4:
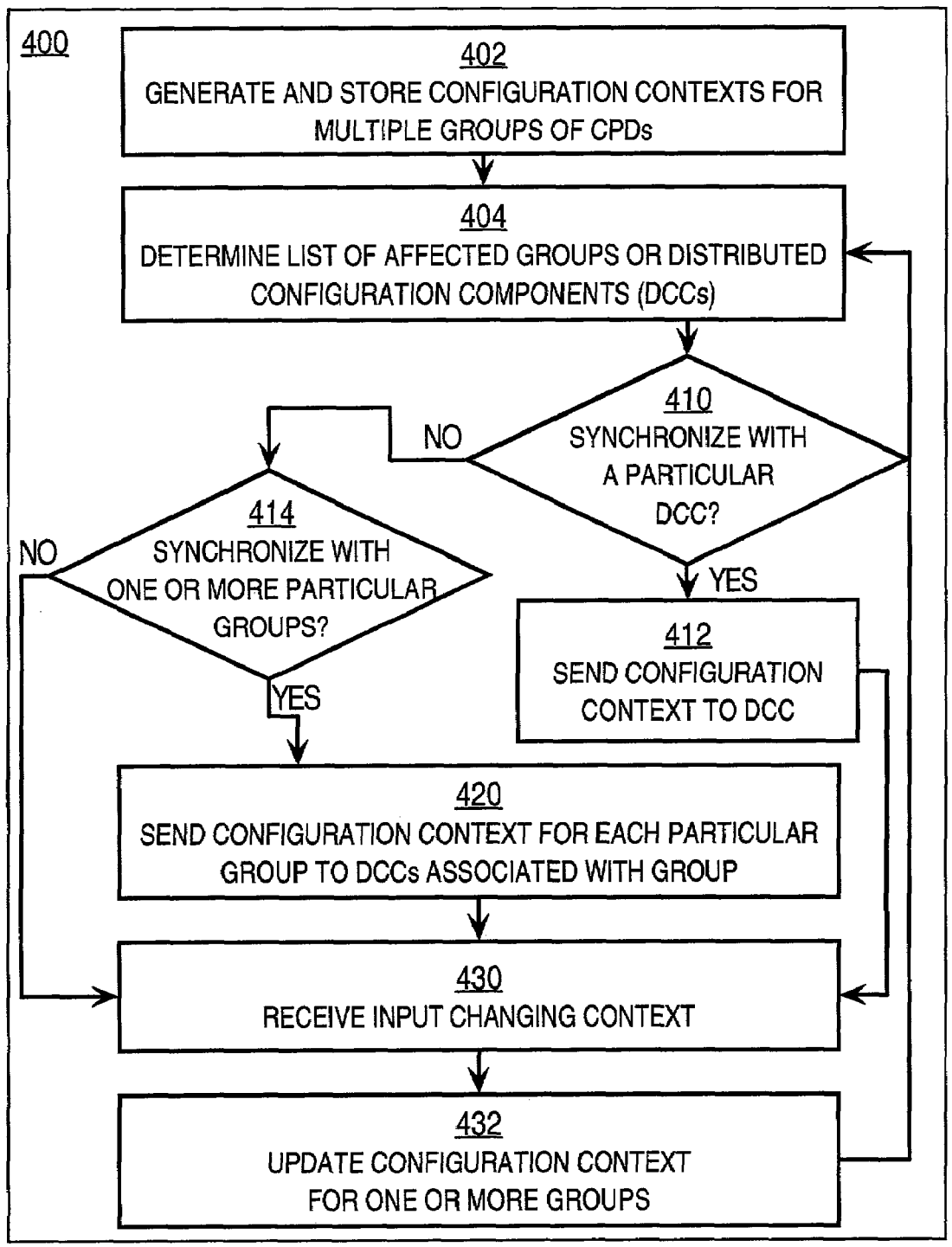
FIG. 4 is a flowchart that illustrates a high level overview of one embodiment of a method performed by a central configuration unit.

FIG. 4 is a flowchart that illustrates a high level overview of embodiment 400 of a method performed by a central configuration unit. For purposes of illustration, examples of the method 400 are described using the CCU 180 of FIG. 1 and, like method 300, using the DCCs 172, 174 shown in FIG. 1.

In step 402, configuration information is generated and stored for each CPE in each provisioning group for all of the affected provisioning groups. For example, configuration contexts are developed based on subscriptions to network services for a large number of users of a particular cable network service provider. The service provider purchases and installs the cable modems at the customer premises and enters the properties of the modem and the subscribed services into a billing system connected to the CCU. Alternatively, in the self-provisioning scenario, the user purchases the modem and registers it through service provider's online interface. The CCU culls the information for data used to generate and store the configuration contexts.

In step 404, the list of affected groups or DCC are retrieved for the current operation. For example, if the operation affects an entire provisioning group or several provisioning groups, such as changing a class of service, a list of all the affected provisioning groups is assembled. If the operation affects a particular DCC, such as a single DCC synchronizing, the list contains only the single DCC.

In step 410 it is determined whether the configuration context stored at the CCU is to be synchronized with the configuration context stored at a particular DCC. For example, it is determined whether a request is received from DCC 172 for synchronizing the configuration information for the two CPEs having the two MAC addresses determined in the example for step 302, described above.

If so, control passes to step 412 in which updated configuration information is sent to the particular DCC. For example, the configuration information for the two CPEs is sent to DCC 172. It is to be noted that the configuration context for the two devices is not sent to the other DCCs, such as to DCC 174 since this provisioning engines are not out of synchronization. Control then passes to step 430. If it is determined in step 410 that the configuration information does not have to be synchronized with only a single DCC, control passes to step 414 to determine whether the updated configuration information should be pushed to any of the provisioning groups. For example, it is determined whether sets of DCCs associated with one or more provisioning groups have not received the configuration information generated in step 402 or step 432. For example, a particular change may affect all DCCs within the provisioning group such as the class of service being changed on a CPE.

If it is determined in step 414 that updated configuration information should be pushed to a provisioning group then control passes to step 420 to send the configuration context to all the DCCs associated with the group or groups. For example, the initial configuration context for the Alice Provisioning Group is sent to DCCs 172, 174, which are DCCs associated with the Alice Provisioning Group in message 210 of FIG. 2A. For another example, in response to the addition of a new CMTS to the network, all DCCs in the affected provisioning group will receive updated configuration information. More specifically, updated configuration information for the new CMTS replacing CMTS 142 is sent to DCCs 172, 174 of the Alice Provisioning Group.

In step 430, the CCU receives an input event to change information for one or more devices or provisioning groups. For one example, a network administrator moves a DCC from association with one provisioning group to another provisioning group. For another example, a cable modem self-registers into the Alice Provisioning Group at a given bandwidth and a level of QoS. For another example, a request is received from DCC 172 in message 222 that indicates the CMTS 142 has changed, rendering the local configuration context invalid. For another example, there is no local configuration information for a new cable modem connected to the cable network 120*a*, causing the DCC 172 to send the request for updated configuration context in message 222 of FIG. 2A.

In response to any of these changes, in step 432, the CCU updates the configuration information of all affected CPEs and sends them to one or more provisioning groups. For example, the CCU generates a default set of static values, instructions, and invalidity conditions for a new cable modem that connected to cable network 129*a* having headend 140*a*. Control then passes to back to step 404 and eventually to step 414 to push the new configuration context for each device to all of the DCCs in the affected provisioning groups.

Hardware Overview

Figure 5:
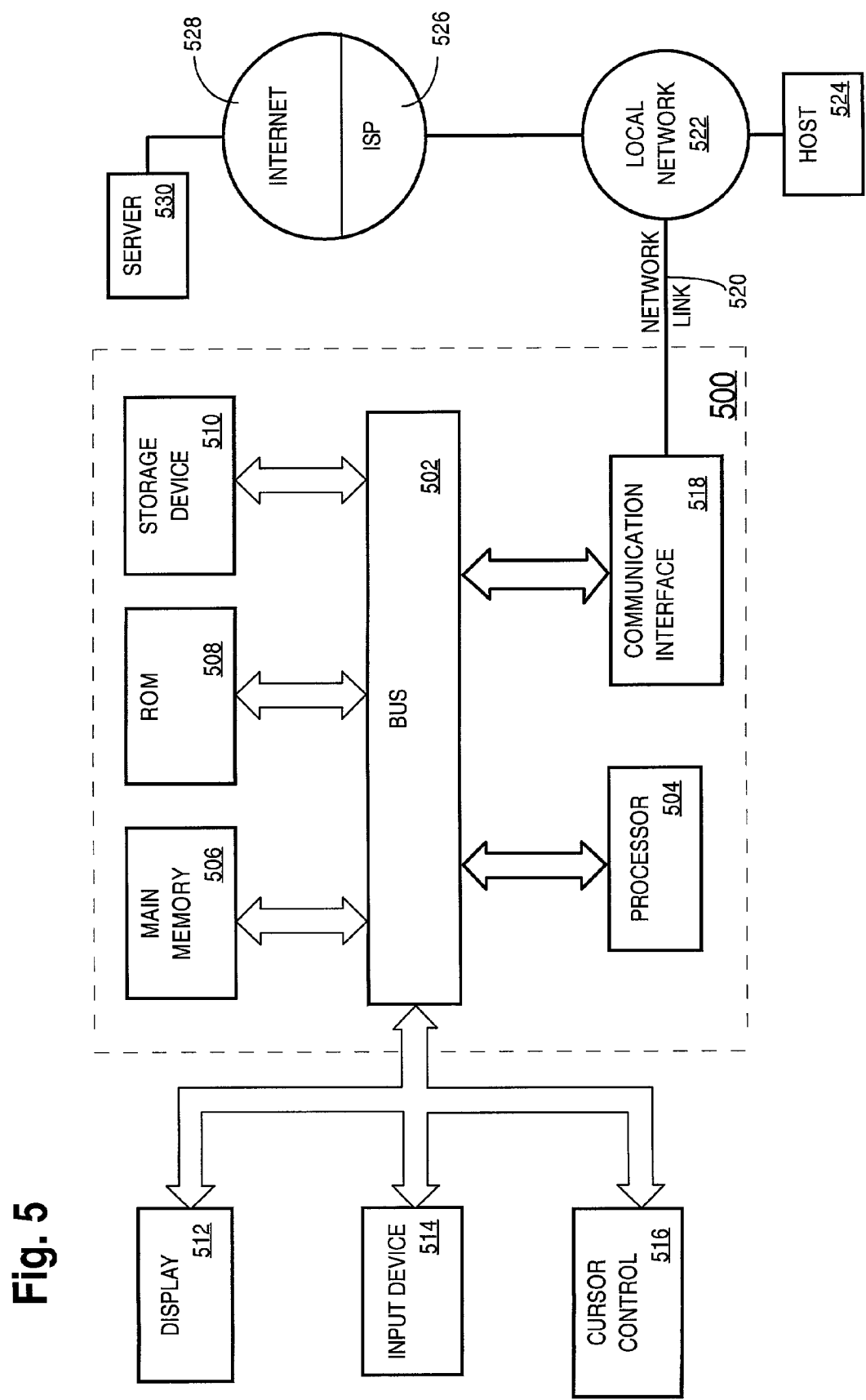
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for configuring a customer premises equipment that is connected to a network of a network service provider, the method comprising the steps of:

receiving, at each distributed component among a plurality of distributed components on the network, configuration information from a central configuration unit on the network, wherein the plurality of distributed components is associated with a particular provisioning group of customer premises equipment;

maintaining, at each distributed component among the plurality of distributed components, a locally-stored configuration context based on the configuration information, wherein each locally-stored configuration context includes a static portion, an instruction portion, and a validity conditions portion, receiving, at one or more distributed components among the plurality of distributed components, from a particular customer premises equipment within the provisioning group, a request for values of a plurality of configuration parameters that determine network properties for the customer premises equipment;

determining, based on utilization data that are associated with each distributed component, a selected distributed component among the plurality of distributed components to process the request;

processing the request by generating, at the selected distributed component, a set of values for the plurality of configuration parameters, based on the request and the locally-stored configuration context; and sending the set of values from the selected distributed component to the particular customer premises equipment, and wherein the configuration information includes instructions that cause a processor at the distributed component to perform the step of generating a value of a parameter of the plurality of configuration parameters; and said step of generating the set of values further comprises executing the instructions on the processor.

2. A method as recited in claim 1, further comprising the steps of:

determining that a change has occurred in the configuration information at the central configuration unit; and in response to determining that a change has occurred in the configuration information at the central configuration unit, sending updated configuration information from the central configuration unit to the distributed component.

3. A method as recited in claim 1, further comprising:

determining whether or not conditions are satisfied for synchronizing the locally-stored configuration context that is maintained at each of the distributed components among the plurality of distributed components with the configuration information at the central configuration unit; and if it is determined that the conditions are satisfied for synchronizing, then:

sending a request from one of the distributed components among the plurality of distributed components to the central configuration unit for updated configuration information from the central configuration unit;

receiving, at each of the distributed components among the plurality of distributed components, the updated configuration information from the central configuration unit; and storing, at each distributed component of the plurality of distributed components, an updated locally-stored configuration context based on the updated configuration information.

4. A method as recited in claim 3, wherein the request to the central configuration unit may include one or more of the parameter values received by the distributed component from the customer premises equipment in its configuration request, for use in generating configuration information for the distributed component.

5. A method as recited in claim 1, further comprising:

determining whether or not conditions are satisfied for validity of the locally-stored configuration context that is maintained at each of the distributed components among the plurality of distributed components; and if it is determined that the conditions are not satisfied for validity, then:

sending a request from one of the distributed components among the plurality of distributed components to the central configuration unit for updated configuration information from the central configuration unit;

receiving, at each of the distributed components among the plurality of distributed components, the updated configuration information from the central configuration unit; and storing, at each distributed component of the plurality of distributed components, an updated locally-stored configuration context based on the updated configuration information.

6. A method as recited in claim 5, wherein the request from the distributed component to the central configuration unit includes the configuration request parameters that have been received from the customer premises equipment, for use in generating a configuration.

7. A method as recited in claim 5, wherein the request for updated configuration information is a request for an incremental update of configuration information.

8. A method as recited in claim 5, wherein:

said step of determining whether or not conditions are satisfied for validity is performed after said step of receiving the request; and if it is determined that the conditions are satisfied for validity, then performing said step of processing the request by generating the set of values for the plurality of configuration parameters without sending a request to the central configuration unit for updated configuration information from the central configuration unit.

9. A method as recited in claim 5, wherein the locally-stored configuration context includes data indicating the conditions for validity of the locally-stored configuration context.

10. A method as recited in claim 1, wherein the configuration information comprises a static template portion at the central configuration unit having one or more substitutable parameters.

11. A method as recited in claim 1, further comprising the step of distributing, from the central configuration unit to the distributed component, further configuration information comprising data, instructions and validation rules sufficient to enable the distributed component to configure devices that are not explicitly identified in the original configuration information.

12. A method as recited in claim 1, wherein the locally-stored configuration context comprises one or more configuration information elements that are device-specific and one or more configuration information elements that are group-specific.

13. A method as recited in claim 1, wherein said configuration information includes data indicating a value for a parameter of the plurality of configuration parameters for a specific device configuration or for a group of device configurations.

14. A method as recited in claim 1, said step of sending the set of values further comprising the steps of:
sending to the customer premises equipment a message including data indicating a particular file on the selected distributed component;
receiving from the customer premises equipment a request for the particular file;
in response to the request for the particular file, storing a value of a parameter of the plurality of configuration parameters in the particular file; and
sending the particular file to the customer premises equipment.

15. A method as recited in claim 14, wherein said step of receiving the request for values of the plurality of configuration parameters and said step of sending the set of values are performed according to dynamic host configuration protocol (DHCP).

16. A method as recited in claim 14, wherein said step of receiving the request for the particular file and said step of sending the particular file are performed according to trivial file transfer protocol (TFTP).

17. A method as recited in claim 14, wherein the selected distributed component is closer to the customer premises equipment on the network than is the central configuration unit.

18. A computer-readable storage medium carrying one or more sequences of instructions for configuring a customer premises equipment connected to a network of a network service provider, which instructions, when executed by one or more processors, cause the one or more processors to carry out the steps of:
receiving, at each distributed component among a plurality of distributed components on the network, configuration information from a central configuration unit on the network, wherein the plurality of distributed components is associated with a particular provisioning group of customer premises equipment;
maintaining, at each distributed component among the plurality of distributed components, a locally-stored configuration context based on the configuration information,
wherein each locally-stored configuration context includes a static portion, an instruction portion, and a validity conditions portion, and
wherein said instruction portion includes instructions that cause a processor at the distributed component to perform the step of generating a value of a parameter of the plurality of configuration parameters; and
said step of generating the set of values further comprises executing the instructions on the processor;
receiving, at one or more distributed components among the plurality of distributed components, from a particular customer premises equipment within the provisioning group, a request for values of a plurality of configuration parameters that determine network properties for the customer premises equipment;
determining, based on utilization data that are associated with each distributed component, a selected distributed component among the plurality of distributed components to process the request;
processing the request by generating, at the selected distributed component, a set of values for the plurality of configuration parameters based on the request and the locally-stored configuration context; and
sending the set of values from the selected distributed component to the particular customer premises equipment.

19. A computer-readable storage medium as recited in claim 18, wherein the one or more sequences of instructions, when executed, further cause the one or more processors to carry out the steps of:
determining that a change has occurred in the configuration information at the central configuration unit; and
in response to determining that a change has occurred in the configuration information at the central configuration unit, sending updated configuration information from the central configuration unit to the distributed component.

20. A computer-readable storage medium as recited in claim 18, wherein the one or more sequences of instructions, when executed, further cause the one or more processors to carry out the steps of:
determining whether or not conditions are satisfied for synchronizing the locally-stored configuration context that is maintained at each of the distributed components among the plurality of distributed components with the configuration information at the central configuration unit; and
if it is determined that the conditions are satisfied for synchronizing, then:
sending a request from one of the distributed components among the plurality of distributed components to the central configuration unit for updated configuration information from the central configuration unit;
receiving, at each of the distributed components among the plurality of distributed components, the updated configuration information from the central configuration unit; and
storing, at each distributed component of the plurality of distributed components, an updated locally-stored configuration context based on the updated configuration information.

21. A computer-readable storage medium as recited in claim 18, wherein the one or more sequences of instructions, when executed, further cause the one or more processors to carry out the steps of:
   determining whether or not conditions are satisfied for validity of the locally-stored configuration context that is maintained at each of the distributed components among the plurality of distributed components; and
   if it is determined that the conditions are not satisfied for validity, then:
      sending a request from one of the distributed components among the plurality of distributed components to the central configuration unit for updated configuration information from the central configuration unit;
      receiving, at each of the distributed components among the plurality of distributed components, the updated configuration information from the central configuration unit; and
      storing, at each distributed component of the plurality of distributed components, an updated locally-stored configuration context based on the updated configuration information.

22. A computer-readable storage medium as recited in claim 21, wherein the request for updated configuration information is a request for an incremental update of configuration information.

23. A computer-readable storage medium as recited in claim 21, wherein:
   said step of determining whether or not conditions are satisfied for validity is performed after said step of receiving the request; and
   if it is determined that the conditions are satisfied for validity, then performing said step of processing the request by generating the set of values for the plurality of configuration parameters without sending a request to the central configuration unit for updated configuration information from the central configuration unit.

24. A computer-readable storage medium as recited in claim 21, wherein the locally-stored configuration context includes data indicating the conditions for validity of the locally-stored configuration context.

25. A computer-readable storage medium as recited in claim 18, wherein the configuration information comprises a static template portion at the central configuration unit having one or more substitutable parameters.

26. A computer-readable storage medium as recited in claim 18, wherein the one or more sequences of instructions, when executed, further cause the one or more processors to carry out the steps of distributing, from the central configuration unit to the distributed component, further configuration information comprising data, instructions and validation rules sufficient to enable the distributed component to configure devices that are not explicitly identified in the New configuration information.

27. A computer-readable storage medium as recited in claim 18, wherein the locally-stored configuration context comprises one or more configuration information elements that are device-specific and one or more configuration information elements that are group-specific.

28. An apparatus for configuring a customer premises equipment device that is connected to a network of a network service provider, comprising:
   a means for receiving, at each distributed component among a plurality of distributed components on the network, configuration information from a central configuration unit on the network, wherein the plurality of distributed components is associated with a particular provisioning group of customer premises equipment;
   a means for maintaining, at each distributed component among the plurality of distributed components, a locally-stored configuration context based on the configuration information,
   wherein each locally-stored configuration context includes a static portion, an instruction portion, and a validity conditions portion, and
   wherein said instruction portion includes instructions that cause a processor at the distributed component to perform the step of generating a value of a parameter of the plurality of configuration parameters; and
   said step of generating the set of values further comprises executing the instructions on the processor;
   a means for receiving, at one or more distributed components among the plurality of distributed components, from a particular customer premises equipment within the provisioning group, a request for values of a plurality of configuration parameters that determine network properties for the customer premises equipment;
   a means for determining, based on utilization data that are associated with each distributed component, a selected distributed component among the plurality of distributed components to process the request;
   a means for processing the request by generating, at the selected distributed component, a set of values for the plurality of configuration parameters, based on the request and the locally-stored configuration context; and
   a means for sending the set of values from the selected distributed component to the particular customer premises equipment.

29. An apparatus as recited in claim 28, further comprising:
   a means for determining that a change has occurred in the configuration information at the central configuration unit; and
   a means for sending updated configuration information from the central configuration unit to the distributed component in response to applying a means for determining that a change has occurred in the configuration information at the central configuration unit.

30. An apparatus as recited in claim 28, further comprising:
   a means for determining whether or not conditions are satisfied for synchronizing the locally-stored configuration context that is maintained at each of the distributed components among the plurality of distributed components with the configuration information at the central configuration unit; and
   further comprising, if it is determined that the conditions are satisfied for synchronizing,
      a means for sending a request from one of the distributed components among the plurality of distributed components to the central configuration unit for updated configuration information from the central configuration unit;
      a means for receiving, at each of the distributed components among the plurality of distributed components, the updated configuration information from the central configuration unit; and
      a means for storing, at each distributed component of the plurality of distributed components, an updated locally-stored configuration context based on the updated configuration information.

31. An apparatus as recited in claim 28, further comprising:
   a means for determining whether or not conditions are satisfied for validity of the locally-stored configuration context that is maintained at each of the distributed components among the plurality of distributed components; and further comprising, if it is determined that the conditions are not satisfied for validity,
- a means for sending a request from one of the distributed components among the plurality of distributed components to the central configuration unit for updated configuration information from the central configuration unit;
- a means for receiving, at each of the distributed components among the plurality of distributed components, the updated configuration information from the central configuration unit; and
- a means for storing, at each distributed component of the plurality of distributed components, an updated locally-stored configuration context based on the updated configuration information.

32. An apparatus as recited in claim 31, wherein the request for updated configuration information is a request for an incremental update of configuration information.

33. An apparatus as recited in claim 31, further comprising, if it is determined that the conditions are satisfied for validity, a means for applying said means for processing the request by generating the set of values for the plurality of configuration parameters without sending a request to the central configuration unit for updated configuration information from the central configuration unit.

34. An apparatus as recited in claim 31, wherein the locally-stored configuration context includes data indicating the conditions for validity of the locally-stored configuration context.

35. An apparatus as recited in claim 28, wherein the configuration information comprises a static template portion at the central configuration unit having one or more substitutable parameters.

36. An apparatus as recited in claim 28, further comprising a means for distributing, from the central configuration unit to the distributed component, further configuration information comprising data, instructions and validation rules sufficient to enable the distributed component to configure devices that are not explicitly identified in the New configuration information.

37. An apparatus as recited in claim 28, wherein the locally-stored configuration context comprises one or more configuration information elements that are device-specific and one or more configuration information elements that are group-specific.

38. A computer apparatus for configuring a customer premises equipment connected to a network of a network service provider, comprising:
- a network interface that is coupled to the network for sending and receiving one or more packet flows thereon;
- a processor;
- one or more stored sequences of instructions which, when executed by the processor, cause the processor to carry out the steps of:
  - receiving, at each distributed component among a plurality of distributed components on the network, configuration information from a central configuration unit on the network, wherein the plurality of distributed components is associated with a particular provisioning group of customer premises equipment;
  - maintaining, at each distributed component among the plurality of distributed components, a locally-stored configuration context based on the configuration information,
  - wherein each locally-stored configuration context includes a static portion, an instruction portion, and a validity conditions portion, and
  - wherein said instruction portion includes instructions that causes a processor at the distributed component to perform the step of generating a value of a parameter of the plurality of configuration parameters; and
  - said step of generating the set of values further comprises executing the instructions on the processor;
  - receiving, at one or more distributed components among the plurality of distributed components, from a particular customer premises equipment within the provisioning group, a request for values of a plurality of configuration parameters that determine network properties for the customer premises equipment;
  - determining, based on utilization data that are associated with each distributed component, a selected distributed component among the plurality of distributed components to process the request;
  - processing the request by generating, at the selected distributed component, a set of values for the plurality of configuration parameters, based on the request and the locally-stored configuration context; and
  - sending the set of values from the selected distributed component to the particular customer premises equipment.

39. An apparatus as recited in claim 38, wherein the one or more stored sequences of instructions, when executed by the processor, further cause the processor to carry out the steps of:
- determining that a change has occurred in the configuration information at the central configuration unit; and
- in response to determining that a change has occurred in the configuration information at the central configuration unit, sending updated configuration information from the central configuration unit to the distributed component.

40. An apparatus as recited in claim 38, wherein the one or more stored sequences of instructions, when executed by the processor, further cause the processor to carry out the steps of:
- determining whether or not conditions are satisfied for synchronizing the locally-stored configuration context that is maintained at each of the distributed components among the plurality of distributed components with the configuration information at the central configuration unit; and
- if it is determined that the conditions are satisfied for synchronizing, then:
  - sending a request from one of the distributed components among the plurality of distributed components to the central configuration unit for updated configuration information from the central configuration unit;
  - receiving, at each of the distributed components among the plurality of distributed components, the updated configuration information from the central configuration unit; and
  - storing, at each distributed component of the plurality of distributed components, an updated locally-stored configuration context based on the updated configuration information.

41. An apparatus as recited in claim 38, wherein the one or more stored sequences of instructions, when executed by the processor, further cause the processor to carry out the steps of:
- determining whether or not conditions are satisfied for validity of the locally-stored configuration context that is maintained at each of the distributed components among the plurality of distributed components; and if it is determined that the conditions are not satisfied for validity, then:
  sending a request from one of the distributed components among the plurality of distributed components to the central configuration unit for updated configuration information from the central configuration unit;
  receiving, at each of the distributed components among the plurality of distributed components, the updated configuration information from the central configuration unit; and
  storing, at each distributed component of the plurality of distributed components, an updated locally-stored configuration context based on the updated configuration information.

42. An apparatus as recited in claim 41, wherein the request for updated configuration information is a request for an incremental update of configuration information.

43. An apparatus as recited in claim 41, wherein the locally-stored configuration context includes data indicating the conditions for validity of the locally-stored configuration context.

44. An apparatus as recited in claim 38, wherein the configuration information comprises a static template portion at the central configuration unit having one or more substitutable parameters.

45. An apparatus as recited in claim 38, wherein the one or more stored sequences of instructions, when executed by the processor, further cause the processor to carry out the step of distributing, from the central configuration unit to the distributed component, further configuration information comprising data, instructions and validation rules sufficient to enable the distributed component to configure devices that are not explicitly identified in the New configuration information.

46. An apparatus as recited in claim 41, wherein:
  said step of determining whether or not conditions are satisfied for validity is performed after said step of receiving the request; and
  if it is determined that the conditions are satisfied for validity, then performing said step of processing the request by generating the set of values for the plurality of configuration parameters without sending a request to the central configuration unit for updated configuration information from the central configuration unit.

47. An apparatus as recited in claim 38, wherein the locally-stored configuration context comprises one or more configuration information elements that are device-specific and one or more configuration information elements that are group-specific.

48. A system for dynamically configuring customer premises equipment connected to a network of a network service provider, comprising:
  the network;
  a central configuration unit comprising a central configuration unit processor connected to the network;
  a plurality of sets of one or more distributed components comprising distributed component processors connected to the network, each set associated with a respective group of a plurality of groups of one or more customer premises equipments;
wherein,
  the central configuration unit processor is configured to carry out the steps of:
    generating and storing, at a central configuration unit on the network, a configuration context for a plurality of groups of customer premises equipments, wherein the configuration context comprises zero or more elements of configuration information for each customer premises equipment in each of the plurality of groups;
    determining whether to synchronize the configuration context stored at the central configuration unit for a particular group of the plurality of group; and
    if it is determined to synchronize the configuration context for the particular group, sending the configuration context for the particular group to the set of one or more distributed components associated with the particular group,
      wherein each distributed component of the set of one or more distributed components maintains at least one locally-stored configuration context,
      wherein each locally-stored configuration context includes a static portion, an instruction portion, and a validity conditions portion, and
      wherein said instruction portion includes instructions that causes a processor at the distributed component to perform the step of generating a value of a parameter of the plurality of configuration parameters; and
    said step of generating the set of values further comprises executing the instructions on the processor; and
  each distributed component processor is configured to carry out the steps of:
    receiving, at one or more distributed components among the set of one or more distributed components, from a customer premises equipment a request for values of a plurality of configuration parameters that determine network properties for the customer premises equipment;
    determining, based on utilization data that are associated with each distributed component, a selected distributed component among the plurality of distributed components to process the request;
    processing the request by generating, at the selected distributed component, a set of values for the plurality of configuration parameters, based on the request and the locally-stored configuration context; and
    sending the set of values from the selected distributed component to the particular customer premises equipment.

* * * * *

UNITED STATES PATENT AND TRADEMARK OFFICE
CERTIFICATE OF CORRECTION

| | |
|---|---|
| PATENT NO. | : 7,600,003 B1 |
| APPLICATION NO. | : 10/128163 |
| DATED | : October 6, 2009 |
| INVENTOR(S) | : Okmianski et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1458 days.

Signed and Sealed this

Twenty-eighth Day of September, 2010

David J. Kappos
*Director of the United States Patent and Trademark Office*